(12) United States Patent
Chiu

(10) Patent No.: US 10,775,841 B2
(45) Date of Patent: Sep. 15, 2020

(54) COMPUTER DEVICE CAPABLE OF REMOVING POP-UP WEBCAM

(71) Applicant: Quanta Computer Inc., Taoyuan (TW)

(72) Inventor: Ying-Chuan Chiu, Taoyuan (TW)

(73) Assignee: Quanta Computer Inc., Taoyuan (TW)

(*) Notice: Subject to any disclaimer, the term of this patent is extended or adjusted under 35 U.S.C. 154(b) by 97 days.

(21) Appl. No.: 16/213,069

(22) Filed: Dec. 7, 2018

(65) Prior Publication Data

US 2020/0064882 A1 Feb. 27, 2020

(30) Foreign Application Priority Data

Aug. 22, 2018 (TW) .............................. 107211541 U

(51) Int. Cl.
*G06F 1/16* (2006.01)
*H04N 5/225* (2006.01)
(52) U.S. Cl.
CPC ......... *G06F 1/1605* (2013.01); *H04N 5/2252* (2013.01); *H04N 5/2253* (2013.01); *G06F 2200/1612* (2013.01)

(58) Field of Classification Search
CPC .......... G06F 1/1605; G06F 2200/1612; H04N 5/2252; H04N 5/2253
See application file for complete search history.

(56) References Cited

U.S. PATENT DOCUMENTS 8,432,485 B1 * 4/2013 Martinez .............. H04N 5/2254
348/207.1

* cited by examiner

*Primary Examiner* — Twyler L Haskins
*Assistant Examiner* — Fayez Bhuiyan

(57) ABSTRACT

A computer device capable of removing a pop-up webcam includes a main frame, a movable frame, a coupling element, a video camera module, a separating unit and a compression spring. The movable frame is liftable in an assembly slot of the main frame. The coupling element is slidable on the movable frame. The video camera module is removably connected to the main frame and liftable in the assembly slot. The separating unit is used to selectively disengage the coupling element from the video camera module. The compression spring is elastically connected to the coupling element and the movable frame, and used to immediately move the coupling element away from the video camera module as the coupling element being apart from the video camera module.

9 Claims, 15 Drawing Sheets

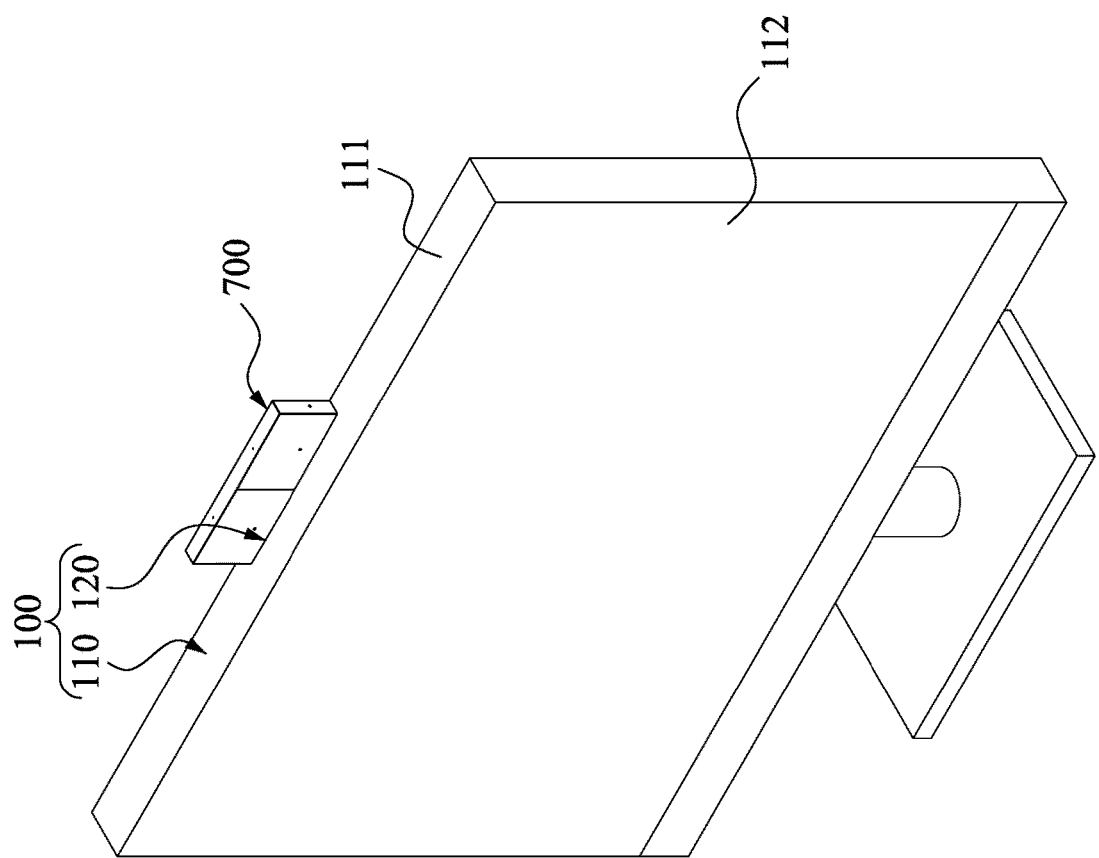

COMPUTER DEVICE CAPABLE OF REMOVING POP-UP WEBCAM

RELATED APPLICATIONS

This application claims priority to Taiwan Application Serial Number 107211541, filed Aug. 22, 2018, which is herein incorporated by reference.

BACKGROUND

Field of Disclosure

The disclosure relates to a computer device. More particularly, the disclosure relates to a computer device capable of removing a pop-up webcam installed therein.

Description of Related Art

As technology industries increasingly develop, an electronic product, such as a notebook PC or all-in-one (AIO) computer, is designed towards convenient, versatile and aesthetical directions. For example, a camera module is mostly provided on a display screen of a conventional computer for users to take photo pictures, video calls or video recordings.

However, since a main frame of an electronic product has a specific specification structure, the maker only can assemble to the main frame of the electronic product with a specific camera module which matches the structure of the main frame in the current assembling practice. In other words, another camera module with different specification structure (e.g., framing heights) cannot be assembled to the main frame having the unified specification structure. Thereby, not only having shortage of the variability and diversity of assembly, but also reducing the using willingness of users.

SUMMARY

One aspect of disclosure is to provide a computer device capable of removing a pop-up webcam installed therein so as to solve the difficulties mentioned in the prior art above.

In one embodiment of the disclosure, the computer device provided in the embodiment includes a main frame, a movable frame, a coupling element, a video camera module, a separating unit and a compression spring. The main frame has a casing and an assembly slot formed on a surface of the casing. The movable frame is liftable in the assembly slot. The coupling element is slidably disposed on the movable frame. The video camera module is removably coupled with the coupling element and liftable in the assembly slot. The separating unit is selectively disengaged the coupling element from the video camera module. The compression spring is elastically connected to the coupling element and the movable frame, for immediately moving the coupling element away from the video camera module when the coupling element and the video camera module are apart from each other.

Thus, through the construction mentioned above, the user can decide to remove the video camera module from the main frame, or replace the video camera module with another. In this way, not only the variability and diversity of assembly can be provided, but also the using willingness of users can be increased.

According to one or more embodiments of the disclosure, in the computer device, the video camera module includes a pushing portion. The movable frame includes a rotating lever, a pivot shaft and a torsion spring. The rotating lever is provided with a first end and a second end being opposite to each other. The pivot shaft is arranged between the first end and the second end. The torsion spring is connected to the rotating lever and the movable frame. When the pushing portion of the video camera module extends into the assembly slot to push the rotating lever at the first end thereof, the rotating lever is rotated about the pivot shaft to position the second end thereof to be transverse.

According to one or more embodiments of the disclosure, in the computer device, the casing includes a stopping flange fixedly disposed in the assembly slot. A vertical projection of the stopping flange overlaps the second end of the rotating lever when the second end of the rotating lever is positioned to be transverse. When the movable frame vertically rises, the stopping flange physically interferes the second end of the rotating lever to determine the height of the video camera module protruding outwards from the assembly slot.

According to one or more embodiments of the disclosure, in the computer device, the movable frame includes an elongated slit. The casing includes a positioning bolt fixed to the casing through the elongated slit, so that the positioning bolt is linearly movable within the elongated slit.

According to one or more embodiments of the disclosure, in the computer device, the coupling element includes an elongated groove. The movable frame includes a positioning pin fixed to the movable frame through the elongated groove, so that the positioning pin is linearly movable within the elongated groove.

According to one or more embodiments of the disclosure, the computer device further includes a spring element connected to the movable frame and the casing. The movable frame is formed with a toothed-strip interface, and the casing includes a toothed wheel and a torque spring. The toothed wheel is pivotally connected to the casing, and engaged with the toothed-strip interface. The torque spring is connected to the toothed wheel and the casing. When a first restored elastic force of the spring element enforces the movable frame to rise, a second restored elastic force of the torque spring slows a rising speed of the movable frame enforced by the first restored elastic force of the spring element.

According to one or more embodiments of the disclosure, in the computer device, the movable frame includes a protruding portion. The casing includes a push-push fastening mechanism. When the video camera module is pressed down to press the push-push fastening mechanism with the protruding portion, the push-push fastening mechanism fastens the protruding portion. When the video camera module is pressed down again to press the push-push fastening mechanism with the protruding portion which has been fastened by the push-push fastening mechanism, the push-push fastening mechanism releases the protruding portion so that the movable frame is free to move.

According to one or more embodiments of the disclosure, in the computer device, the movable frame includes an installation portion disposed within the assembly slot. The main frame includes a circuit board fixedly connected to the installation portion, and provided with a first connector, and the video camera module is provided with a second connector. When the video camera module is moved to the movable frame to hot-pluggably connect to the first connector through the second connector of the video camera module, the video camera module is electrically connected to the main frame.

According to one or more embodiments of the disclosure, in the computer device, the coupling element includes a hook body, and the video camera module includes a housing which is formed with an internal space on one bottom surface of the housing, and a coupling portion which is protrudingly formed on an inner surface of the housing facing towards the internal space for being hooked by the hook body. The separating unit includes an ejector pin and a through hole penetrating through the housing to connect the internal space and align with the coupling element. When the ejector pin is used to push the hook body away from the coupling portion in the inner surface through the through hole, the coupling element is detached from the video camera module.

According to one or more embodiments of the disclosure, in the computer device, the video camera module is a single lens video camera module, a dual lens video camera module or a video camera module having a distance detector.

The above description is merely used for illustrating the problems to be resolved, the technical methods for resolving the problems and their efficacies, etc. The specific details of the disclosure will be explained in the embodiments below and related drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

FIG. 4 is a stereogram view of the video camera module of FIG. 1 when being ejected outwardly;

DESCRIPTION OF THE EMBODIMENTS

Figure 1:
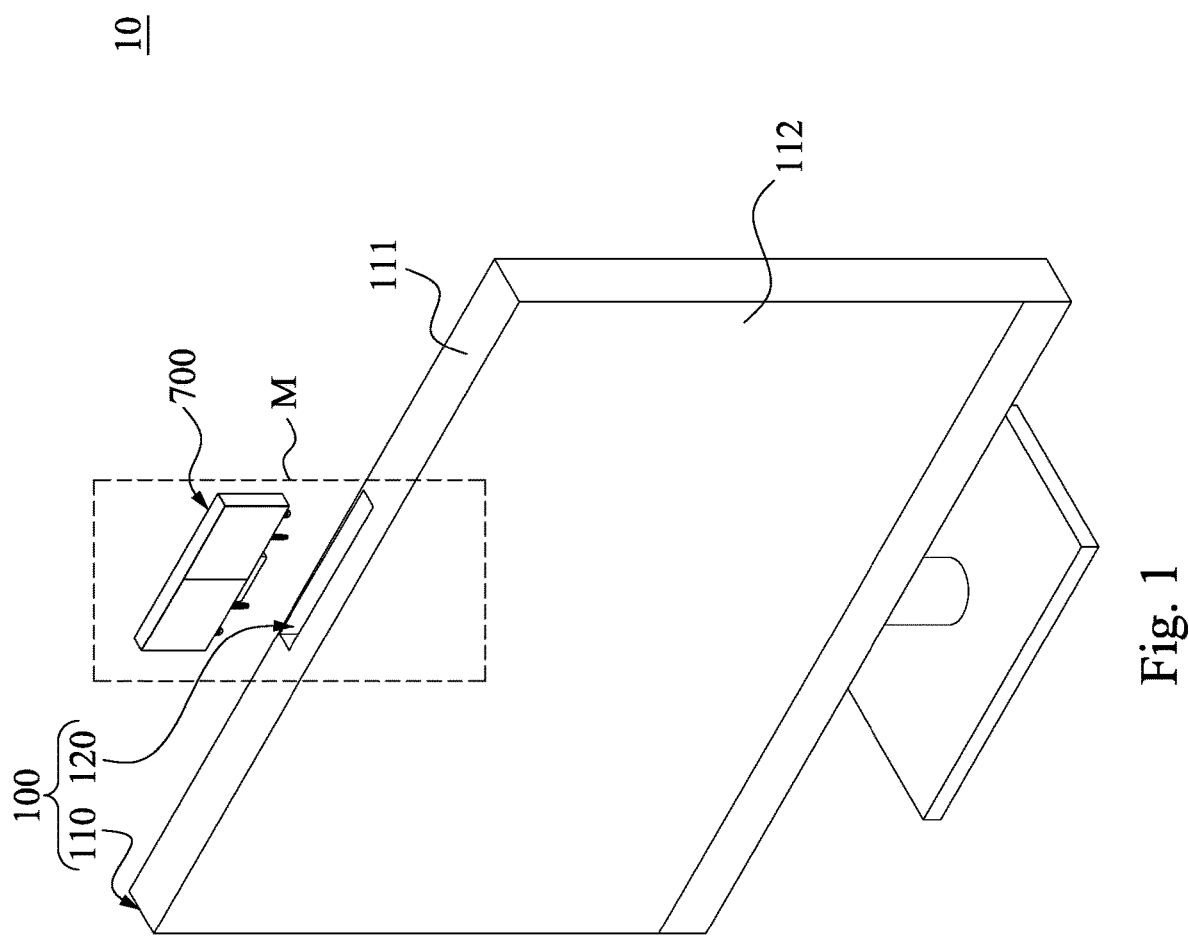
FIG. 1 is a partial exploded view of a computer device according to one embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 2:
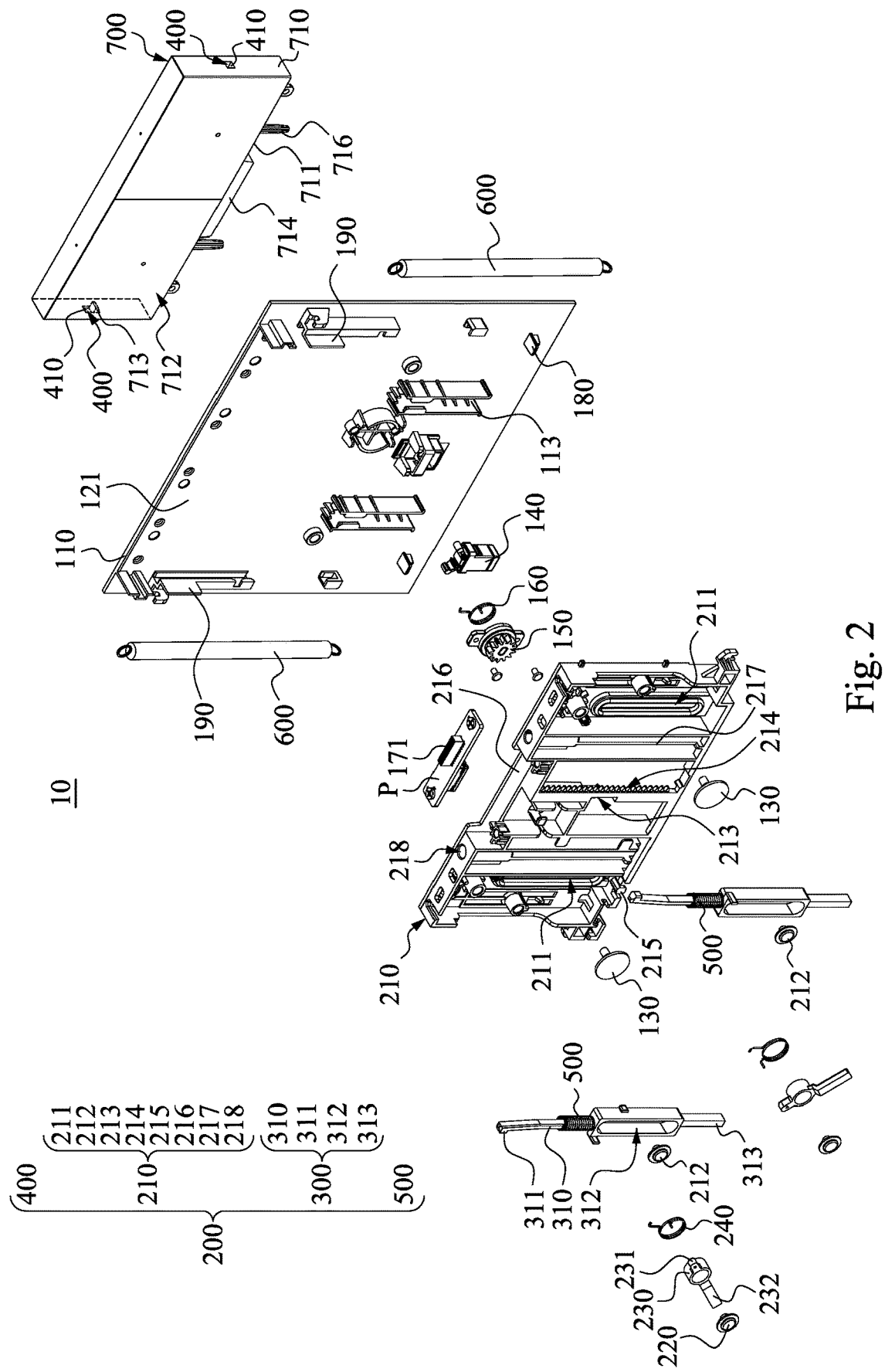
FIG. 2 is a partial exploded view of an area M of the computer device of FIG. 1.
Figure 3A:
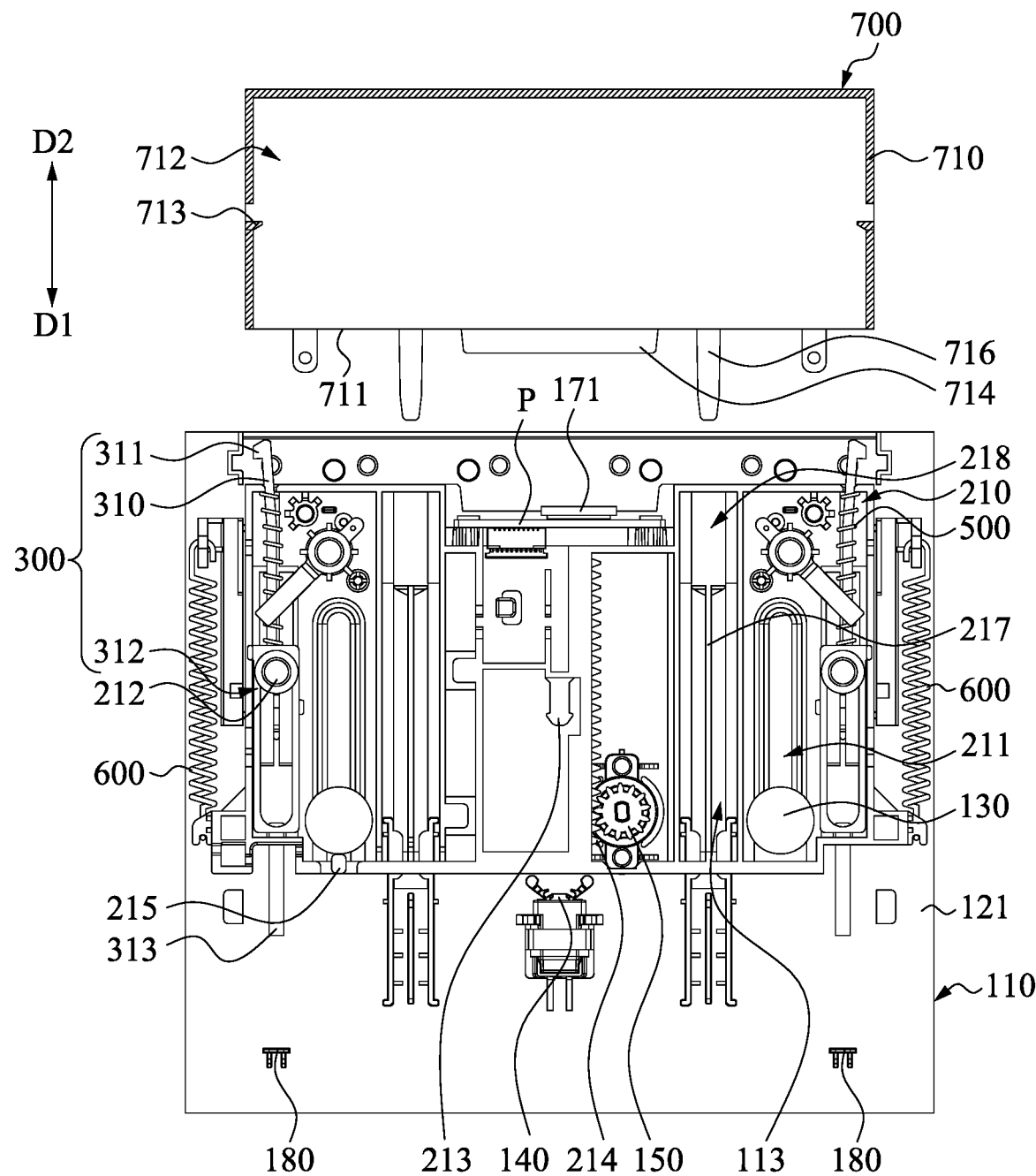
FIG. 3A to FIG. 3C are operational continuous schematic views showing the installation of the video camera module of FIG. 1.
Figure 3B:
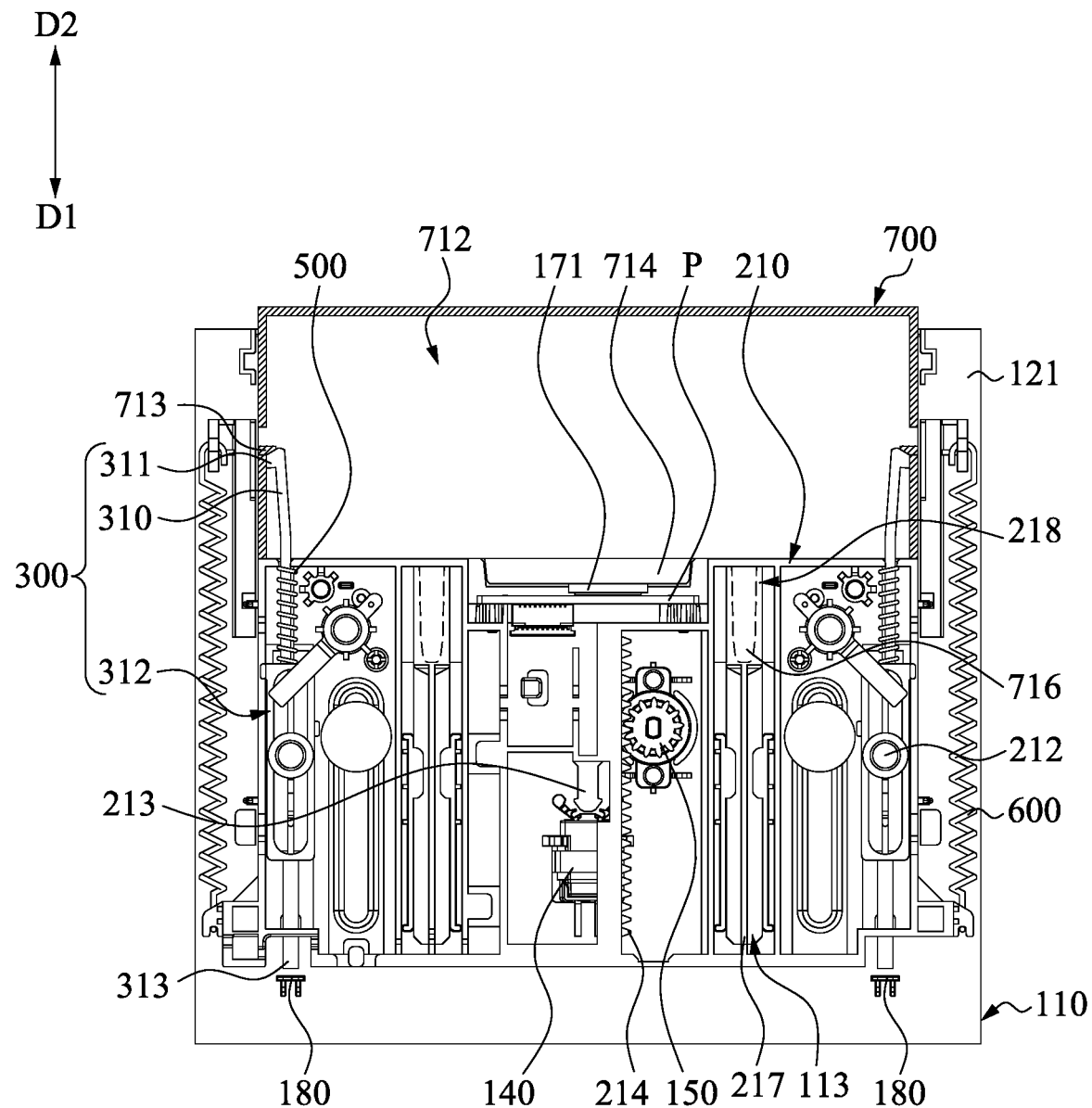
Figure 3C:
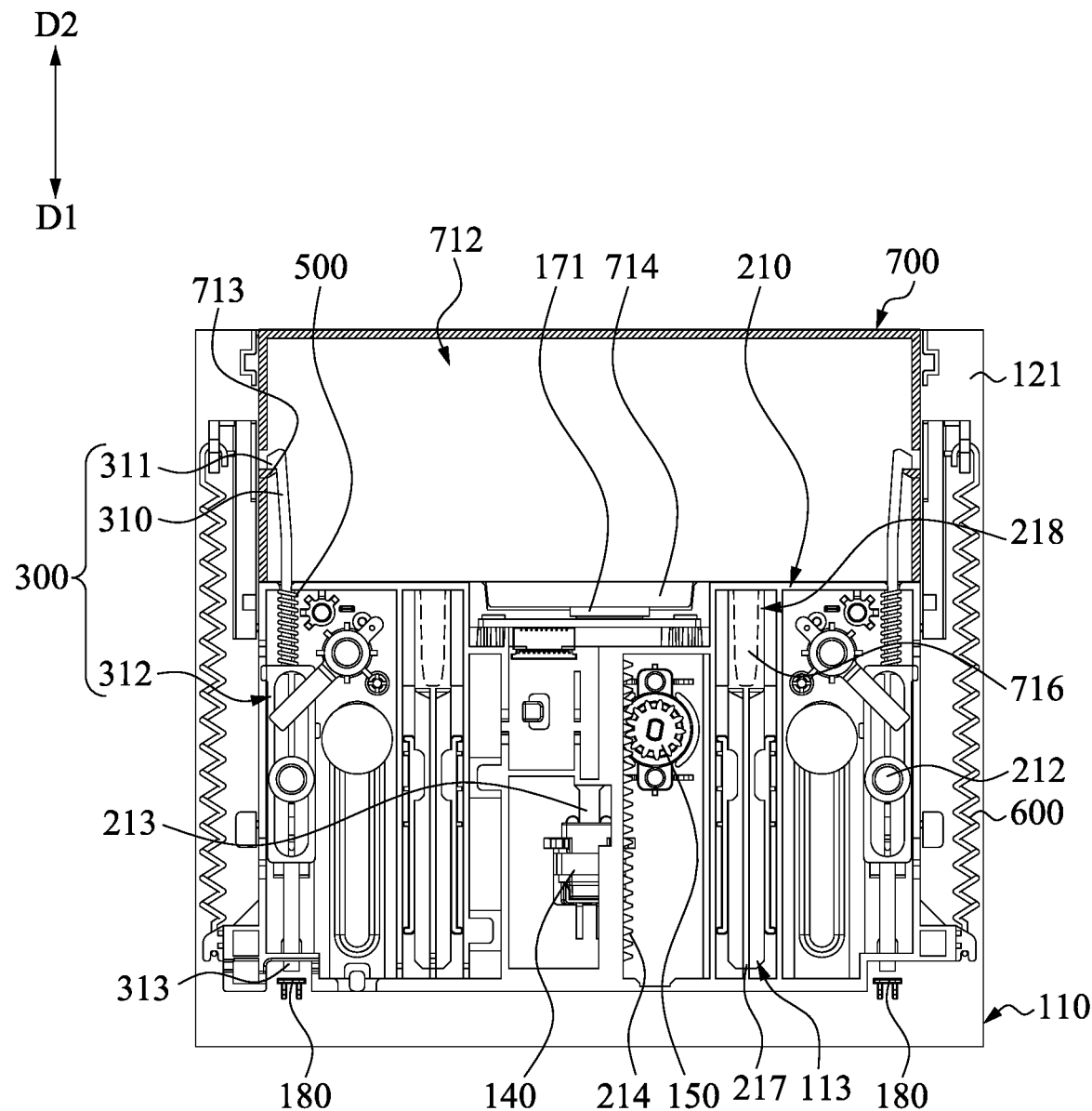

Reference is now made to FIG. 1 to FIG. 3C, in which FIG. 1 is a partial exploded view of a computer device according to one embodiment of the disclosure, FIG. 2 is a partial exploded view of an area M of the computer device of FIG. 1, and FIG. 3A to FIG. 3C are operational continuous schematic views showing the installation of the video camera module of FIG. 1. As shown in FIG. 1 to FIG. 3C, in the embodiment, the computer device 10 includes a main frame 100, a linking module 200 and a video camera module 700. The main frame 100 includes a casing 110 and an assembly slot 120. The assembly slot 120 is formed on a surface of a top side 111 of the casing 110. Exemplarily, the assembly slot 120 is disposed above a display 112 of the main frame 100, however, the disclosure is not limited to the position of the assembly slot 120 on the casing 110. The linking module 200 includes a movable frame 210, two coupling elements 300, two separating units 400 and two compression springs 500. The movable frame 210 is elevatably disposed in the assembly slot 120. Exemplarily, the movable frame 210 can be relatively slidable on the inner surface 121 of the assembly slot 120 of the casing 110, however, the disclosure is not limited thereto. Each of the coupling elements 300 is slidably disposed on the movable frame 210. Exemplarily, the coupling elements 300 are symmetrically disposed on one side of the movable frame 210 opposite to the casing 110, however, the disclosure is not limited thereto. Each of the compression springs 500 is elastically connected to one of the coupling elements 300 and the movable frame 210, respectively. Each of the separating units 400 can be selectively detached one of the coupling elements 300 from the video camera module 700. Exemplarily, the separating units 400 are symmetrically disposed on the movable frame 210, however, the disclosure is not limited thereto.

Thus, when a user inserts the video camera module 700 into the assembly slot 120 and moves the video camera module 700 to the movable frame 210 along a first direction D1, the user next continues to press down the movable frame 210 along the first direction D1 with the video camera module 700 until the coupling elements 300 are displaced to the video camera module 700 to couple the video camera module 700. At this moment, since the video camera module 700 and the movable frame 210 are fixedly coupled to each other, the video camera module 700 can be moved up and down along with the movable frame 210.

More specifically, the movable frame 210 is formed with two guide channels 218. The guide channels 218 are symmetrically formed on a top surface of the movable frame 210, and parallel to the first direction D1, however, the disclosure is not limited thereto. The video camera module 700 includes two guide rods 716. The guide rods 716 are symmetrically formed on a bottom side of the video camera module 700. The long axis direction of each of the guide channels 218 is parallel to the long axis direction of each of the guide rods 716. Thus, with the guide rods 716 respectively inserting into the guide channels 218, the video camera module 700 can be moved to the movable frame 210 in the assembly slot 120 along the first direction D1 smoothly.

Specifically, each of the coupling elements 300 includes a support arm 310 and a hook body 311. The hook body 311 is disposed on one distal end of the support arm 310. The video camera module 700 further includes a housing 710 and at least two coupling portions 713. One bottom surface 711 of the housing 710 is concavely formed with an internal space 712. The coupling portions 713 are oppositely formed in the internal space 712 of the housing 710, and each of the coupling portions 713 is protrudingly formed on an inner surface of the housing 710 facing towards the internal space 712. Thus, when a user presses down the movable frame 210 along the first direction D1 with the video camera module 700, each of the coupling elements 300 can extend into the internal space 712 of the housing 710, and each of the coupling portion 713 can be hooked by the corresponding hook body 311 thus, the coupling elements 300 and the video camera module 700 can be coupled to each other.

The aforementioned casing 110 includes at least one or two positioning bolts 130. The movable frame 210 includes at least one or two elongated slits 211. Each of the positioning bolts 130 is fixedly connected to the casing 110 through one of the elongated slits 211. Exemplarily, each of the positioning bolts 130 is fixedly screwed on the inner surface 121 of the assembly slot 120 so that each of the positioning bolts 130 can be linearly movable within the corresponding elongated slit 211. Accordingly, because each of the positioning bolts 130 can linearly move back and forth within the corresponding elongated slits 211, the movable frame 210 can smoothly slide back and forth relative to the casing 110.

Also, the movable frame 210 includes at least one or two positioning pins 212. Each of the coupling elements 300 includes one elongated groove 312. Each of the positioning pins 212 is fixedly connected to the movable frame 210 through one of the elongated grooves 312. Exemplarily, the elongated groove 312 is formed on the support arm 310, and each of the compression springs 500 is sleeved on the support arm 310 between the elongated groove 312 and hook body 311. Each of the positioning pins 212 is fixedly connected to one surface of the movable frame 210 opposite to the casing 110 so that each of the positioning pins 212 can be linearly movable within the corresponding elongated grooves 312. Accordingly, because each of the positioning pins 212 can linearly move back and forth within the corresponding elongated grooves 312, the coupling elements 300 can smoothly slide back and forth relative to the movable frame 210.

Specifically, the casing 110 further includes at least two guide grooves 113. The guide grooves 113 are symmetrically disposed on the inner surface 121 of the casing 110; however, the disclosure is not limited thereto. The movable frame 210 further includes at least two guide rails 217. The guide rails 217 are spaced on the movable frame 210. Thus, because each of the guide rails 217 is slidably disposed within one of the guide grooves 113, the movable frame 210 can smoothly slide back and forth relative to the casing 110.

Figure 5A:
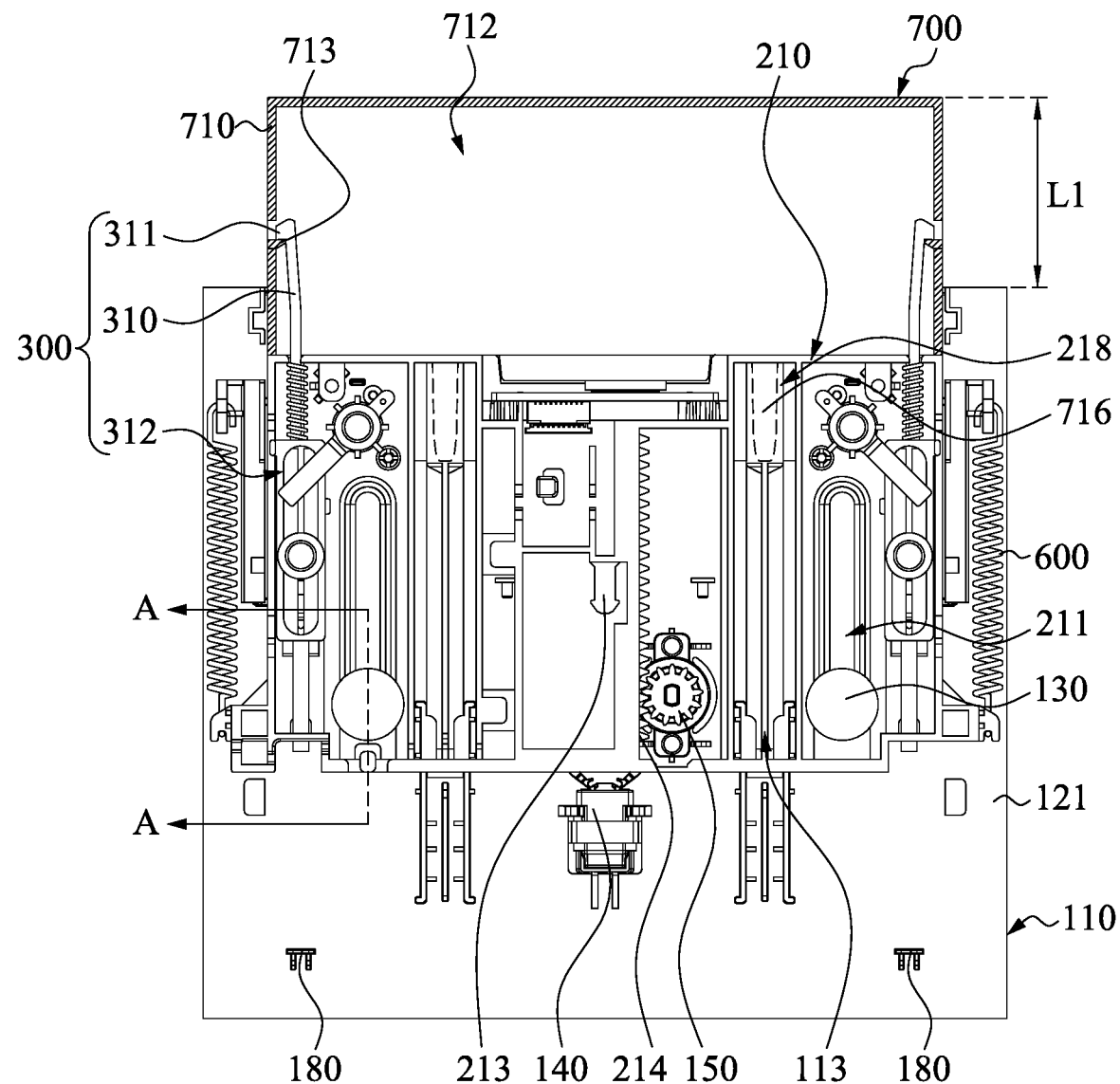
FIG. 5A is a see-through schematic view of FIG. 4.
Figure 5B:
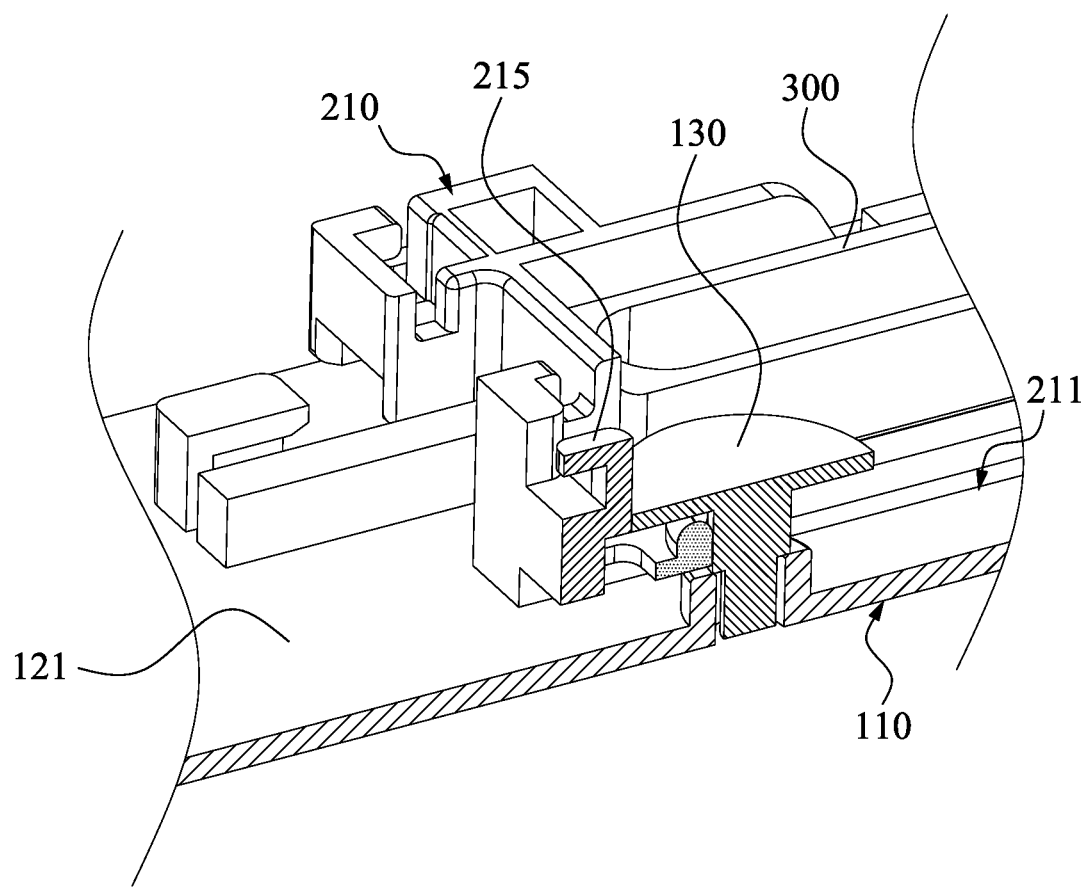
FIG. 5B is a cross sectional view of FIG. 5A viewed along a line A-A.

FIG. 4 is a stereogram view of the video camera module 700 of FIG. 1 when being ejected outwardly. FIG. 5A is a see-through schematic view of FIG. 4. FIG. 5B is a cross sectional view of FIG. 5A viewed along a line A-A. As shown in FIG. 2 and FIG. 5A, the linking module 200 further includes at least two spring elements 600. Each of the spring elements 600 is connected to the movable frame 210 and the casing 110. For example, the spring elements 600 are symmetrically disposed on the inner surface 121 of the assembly slot 120 of the casing 110, and the movable frame 210 is located between the spring elements 600; however, the disclosure is not limited thereto.

When the movable frame 210 is pressed down along the first direction D1 with the video camera module 700, the movable frame 210 respectively presses the spring elements 600 to store a first restored elastic force, respectively. The first restored elastic force is used to rise the movable frame 210 and the video camera module 700 along a second direction D2 so that the video camera module 700 can be ejected out of the assembly slot 120.

Furthermore, for example, the casing 110 includes a push-push fastening mechanism 140. The push-push fastening mechanism 140 is disposed in the assembly slot 120, and fixedly connected to the inner surface 121 of the assembly slot 120. The movable frame 210 includes a protruding portion 213. The protruding portion 213 extends away from the video camera module 700. Thus, when the user presses the video camera module 700 down to move the movable frame 210 downwardly, the push-push fastening mechanism 140 is pressed by the movable frame 210 at the first time, so the push-push fastening mechanism 140 clamps the protruding portion 213. Thus, since the push-push fastening mechanism 140 offsets the first restored elastic force of the spring element 600, the push-push fastening mechanism 140 is able to prevent the movable frame 210 from being risen along the second direction D2.

In contrast, when the user presses the video camera module 700 down again, the push-push fastening mechanism 140 is pressed by the movable frame 210 again to release the protruding portion 213, that is, the protruding portion 213 is not fastened by the push-push fastening mechanism 140 anymore. Thus, the first restored elastic force of the spring element 600 enforces the movable frame 210 to be risen along the second direction D2 so as to uplift the video camera module 700 to partially extend outwards from the assembly slot 120.

It is noted, since the push-push fastening mechanism 140 is well known in the art, the detailed structure of the push-push fastening mechanism 140 will not be described again. However, the disclosure is not limited to the push-push fastening mechanism 140 as an instrument for temporarily holding the movable frame 210.

Furthermore, the movable frame 210 is formed with a toothed-strip interface 214. The casing 110 includes a toothed wheel 150 and a torque spring 160. The toothed wheel 150 is pivotally connected to the casing 110 and engaged with the toothed-strip interface 214. The torque spring 160 is connected to the toothed wheel 150 and the casing 110. Thus, when the first restored elastic force of the spring element 600 moves the movable frame 210 and the video camera module 700 upwardly, the torque spring 160 is compressed to store a second restored elastic force, and the second restored elastic force can partially offset the first restored elastic force so as to slow the rising speed of the movable frame 210 enforced by the first restored elastic force of the spring element 600, thereby protecting the movable frame 210 and the casing 110 from being damaged.

As shown in FIG. 5B, the aforementioned movable frame 210 includes two stopping ribs 215. Each of the stopping ribs 215 is protrudingly formed on an inner edge of the elongated slit 211 opposite to the video camera module 700. Thus, when the first restored elastic force of the spring element 600 rises both of the movable frame 210 and the video camera module 700, each of the stopping ribs 215 physically interferes one of the positioning bolts 130 so as to limit the movable frame 210 from being continue to rise.

In addition, the movable frame 210 includes an installation portion 216. The installation portion 216 is disposed within the assembly slot 120. Exemplarily, the installation portion 216 is a screw seat; however, the disclosure is not limited thereto. The main frame 100 includes a circuit board P. The circuit board P is fixedly connected to the installation portion 216, and provided with a first connector 714. The video camera module 700 further has a working circuit (not shown) and a second connector 171. The working circuit is received within the housing 710. The second connector 171 is mounted on the working circuit, and exposed outwards from the side of the housing 710 having the internal space 712. Thus, when the user inserts the video camera module 700 into the assembly slot 120 and presses the video camera module 700 to the movable frame 210 along the first direction D1, the video camera module 700 can be hot-pluggably connected to the first connector 714 through the second connector 171, so that the video camera module 700 is electrically connected to the main frame 100 for transmitting power and data.

Figure 6A:
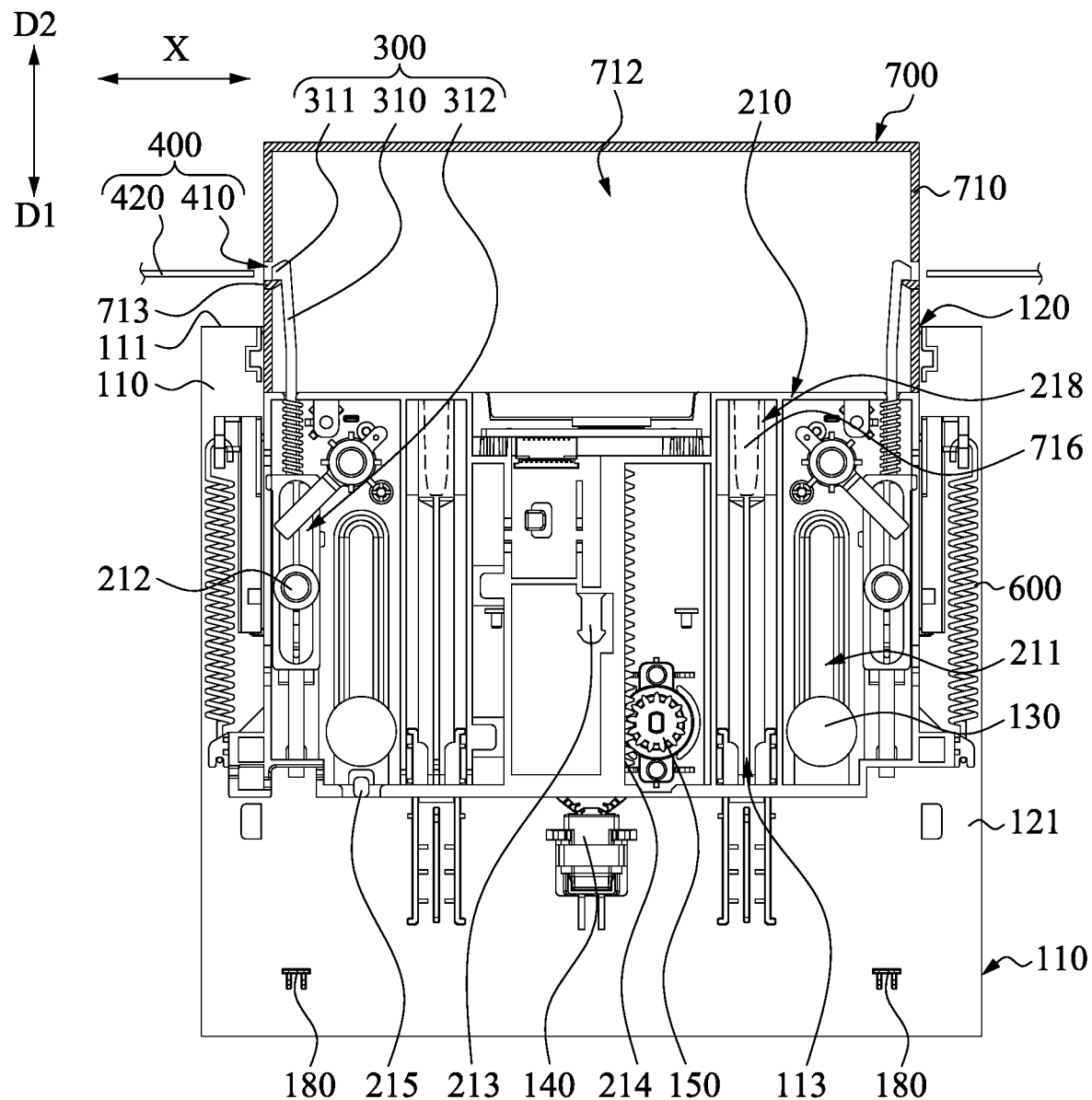
FIG. 6A to FIG. 6C are operational continuous schematic views showing the disassembly of the video camera module of FIG. 1.
Figure 6B:
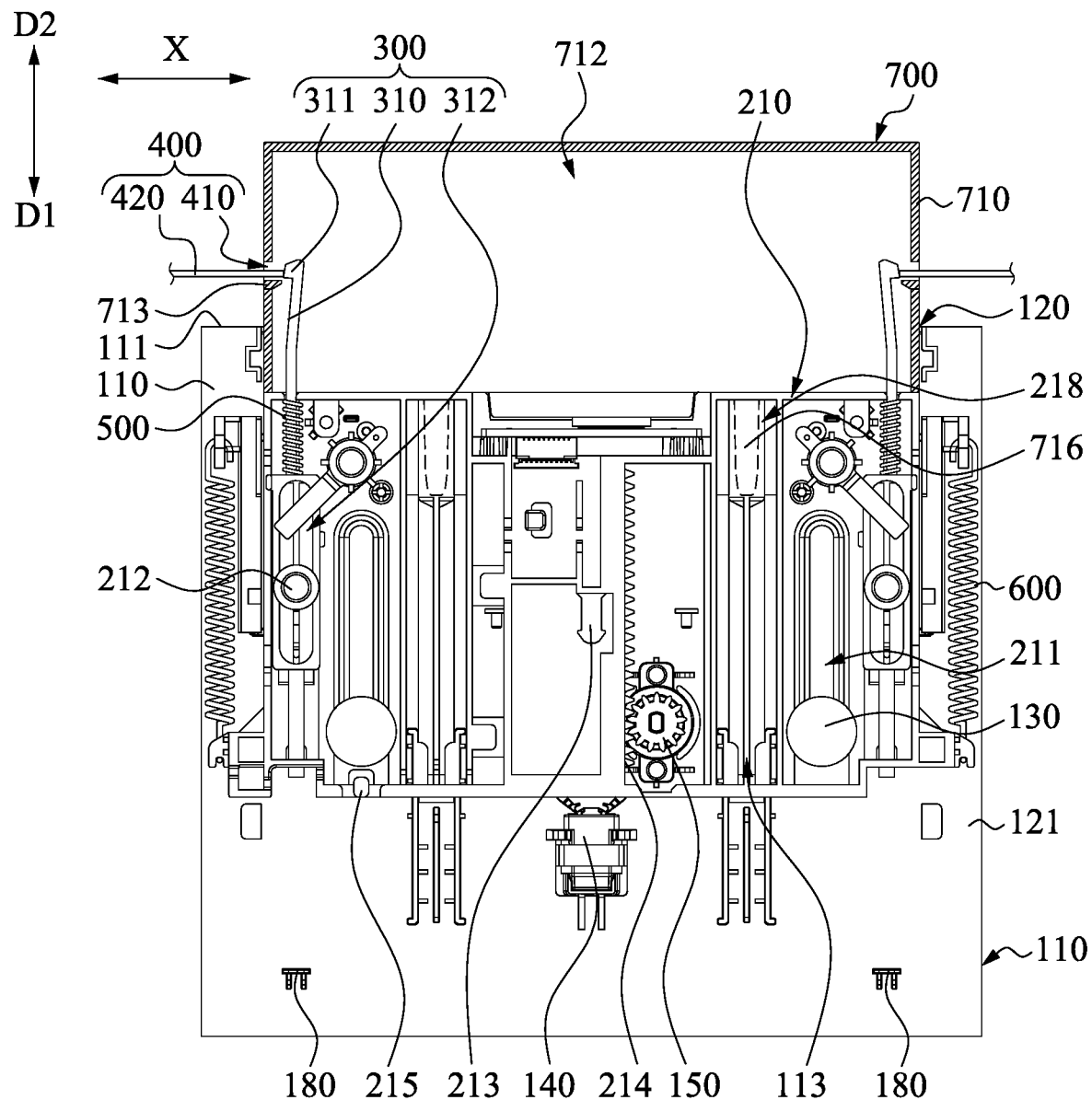
Figure 6C:
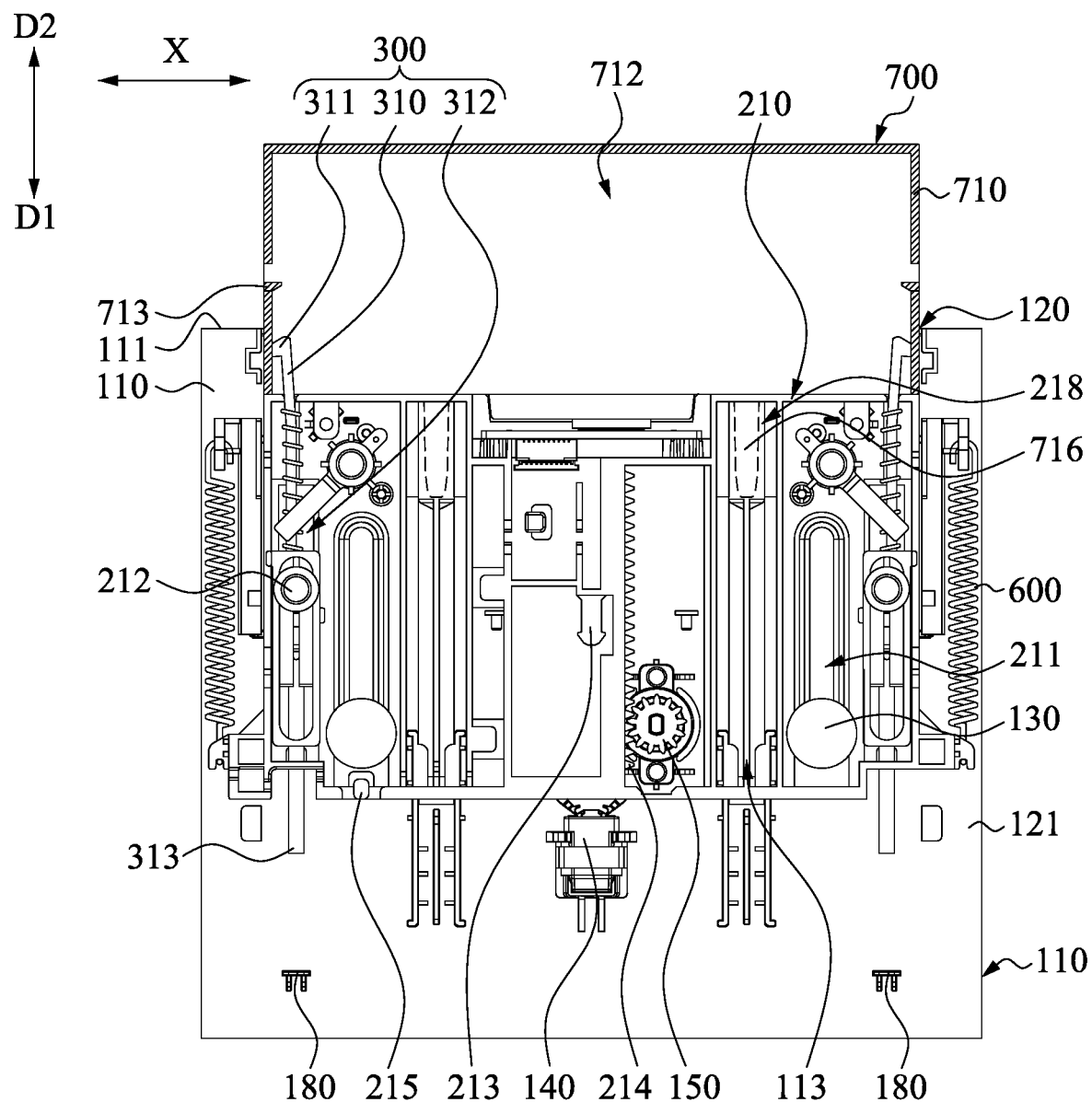

FIG. 6A to FIG. 6C are operational continuous schematic views showing the disassembly of the video camera module 700 of FIG. 1. As shown in FIG. 2 and FIG. 6A, each of the separating units 400 includes a through hole 410. The through hole 410 penetrates through the housing 710 to connect the internal space 712 and to align with the support arm 310 or the hook body 311 of the coupling element 300.

Thus, as shown in FIG. 6A to FIG. 6C, when the user horizontally pushes the coupling element 300 with an ejector pin 420 via one of the through holes 410, e.g., along the direction X of FIG. 6A, thus, since the support arm 310 is deformed, the hook body 311 of the coupling element 300 will be disengaged from the coupling portion 713.

It is noted, when the user continues to press the movable frame 210 along the first direction D1 to couple the video camera module 700 with the coupling element 300, each of the compression springs 500 can be compressed by the movable frame 210 and each of the coupling element 300 so as to store a third restored elastic force capable of returning the coupling element 300 to an original position.

Since the coupling element 300 has been separated from the video camera module 700, the third restored elastic force of the compression springs 500 then moves the coupling element 300 away from the video camera module 700. Accordingly, the user can smoothly detach the video camera module 700 from the assembly slot 120.

Also, the casing 110 further includes at least one or two stopping seats 180. The stopping seats 180 are symmetrically disposed on the inner surface 121 of the assembly slot 120 of the casing 110, and arranged on one side of the inner surface 121 opposite to the video camera module 700, however, the disclosure is not limited thereto. Thus, when the third restored elastic force of the compression springs 500 moves the coupling element 300 away from the video camera module 700, each of the stopping seats 180 physically abuts against an end surface 313 of the other distal end of the support arm 310 being opposite to the hook body 311 so as to limit the coupling element 300 to continually move along the first direction D1.

However, the disclosure is not limited thereto, as long as the coupling element 300 and the video camera module 700 can be disengaged from each other, the separating units 400 of the disclosure is not limited to be a part of the video camera module 700 only, for example, the separating unit 400 is a device which is disposed on the casing 110 and used to displace the coupling element 300.

FIG. 7A to FIG. 7D are operational continuous schematic views showing the installation of the computer device 11 according to another embodiment of the disclosure.

Figure 7A:
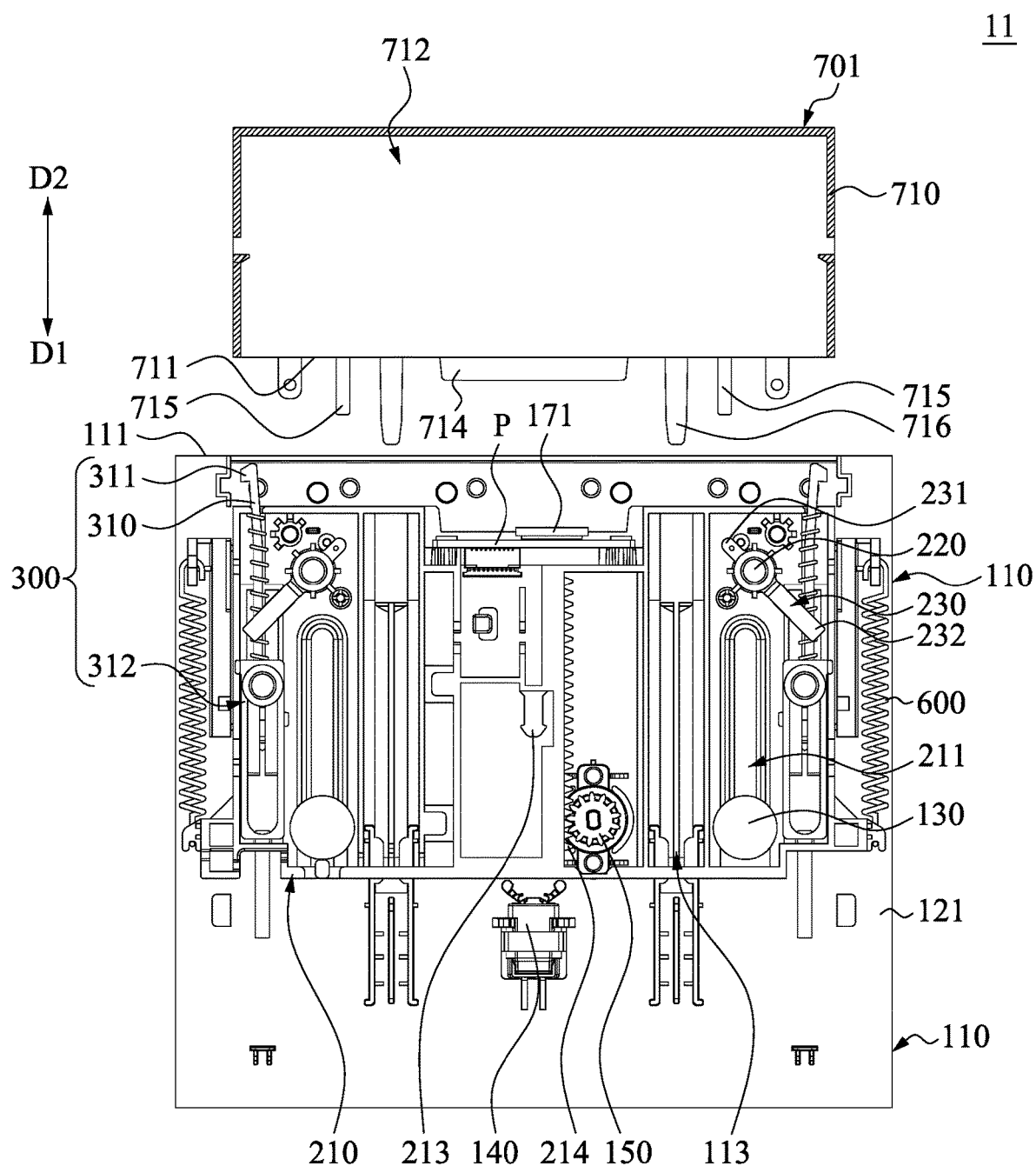
FIG. 7A to FIG. 7D are operational continuous schematic views showing the installation of the computer device according to another embodiment of the disclosure.
Figure 7B:
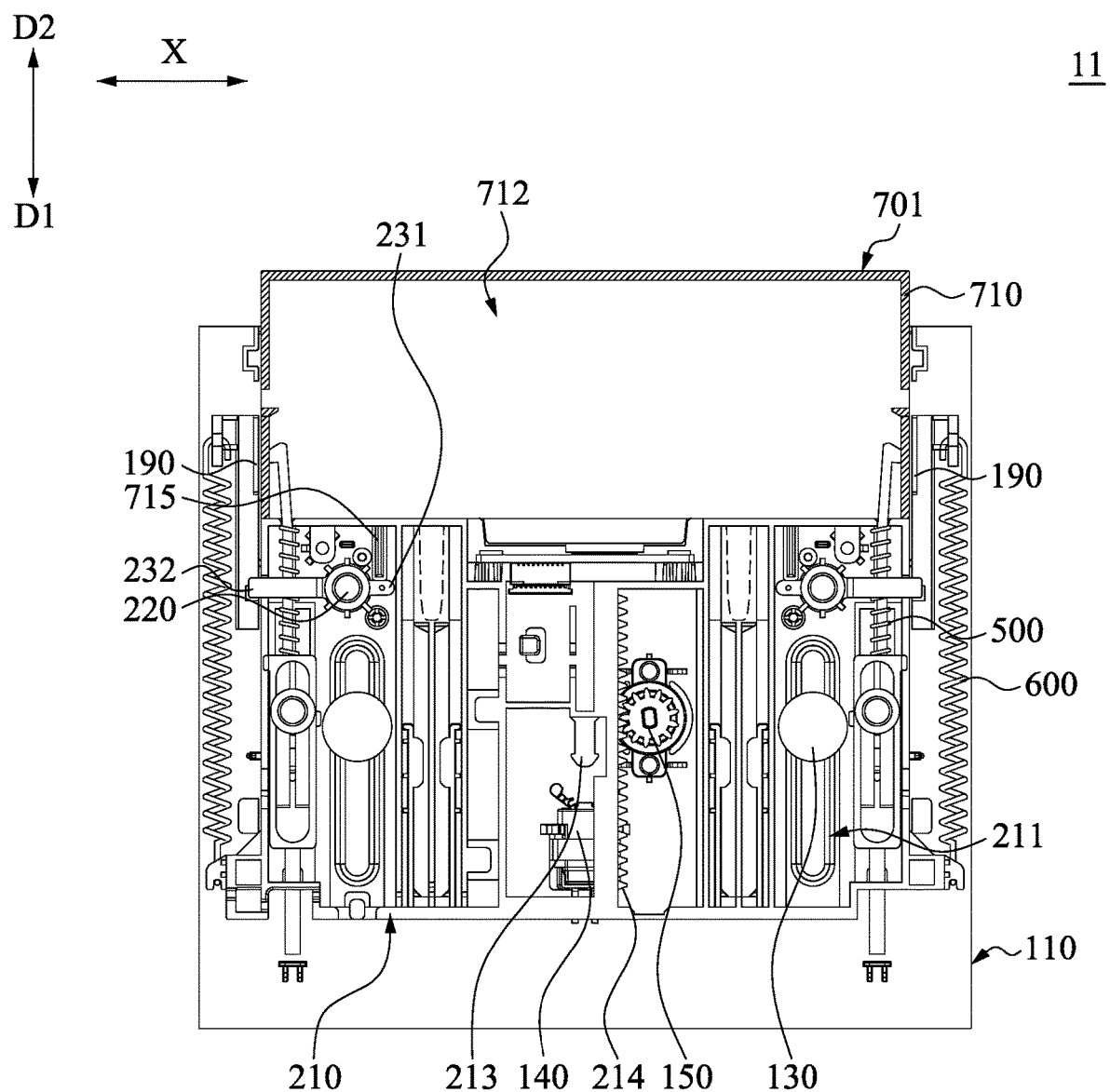
Figure 7C:
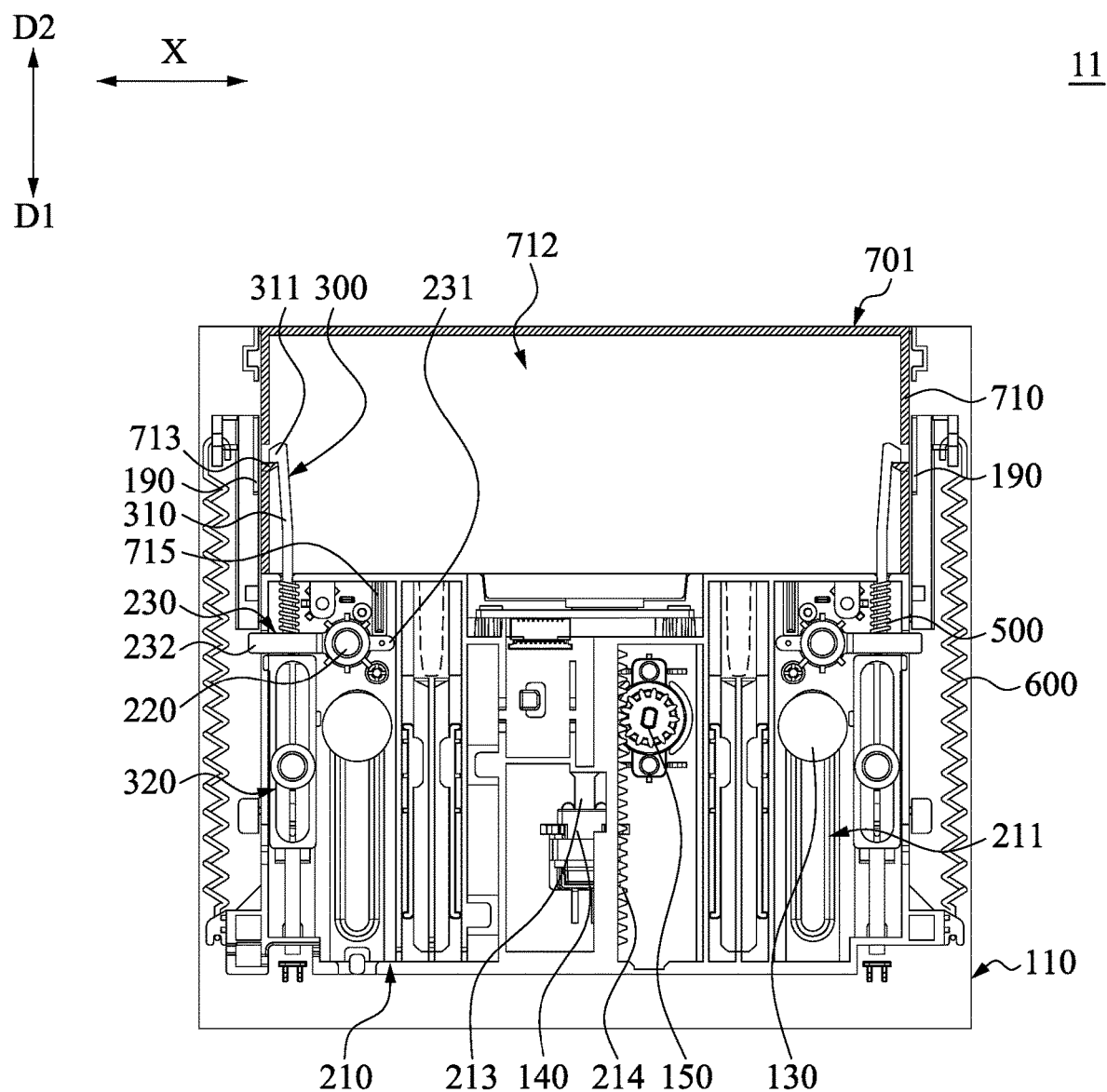
Figure 7D:
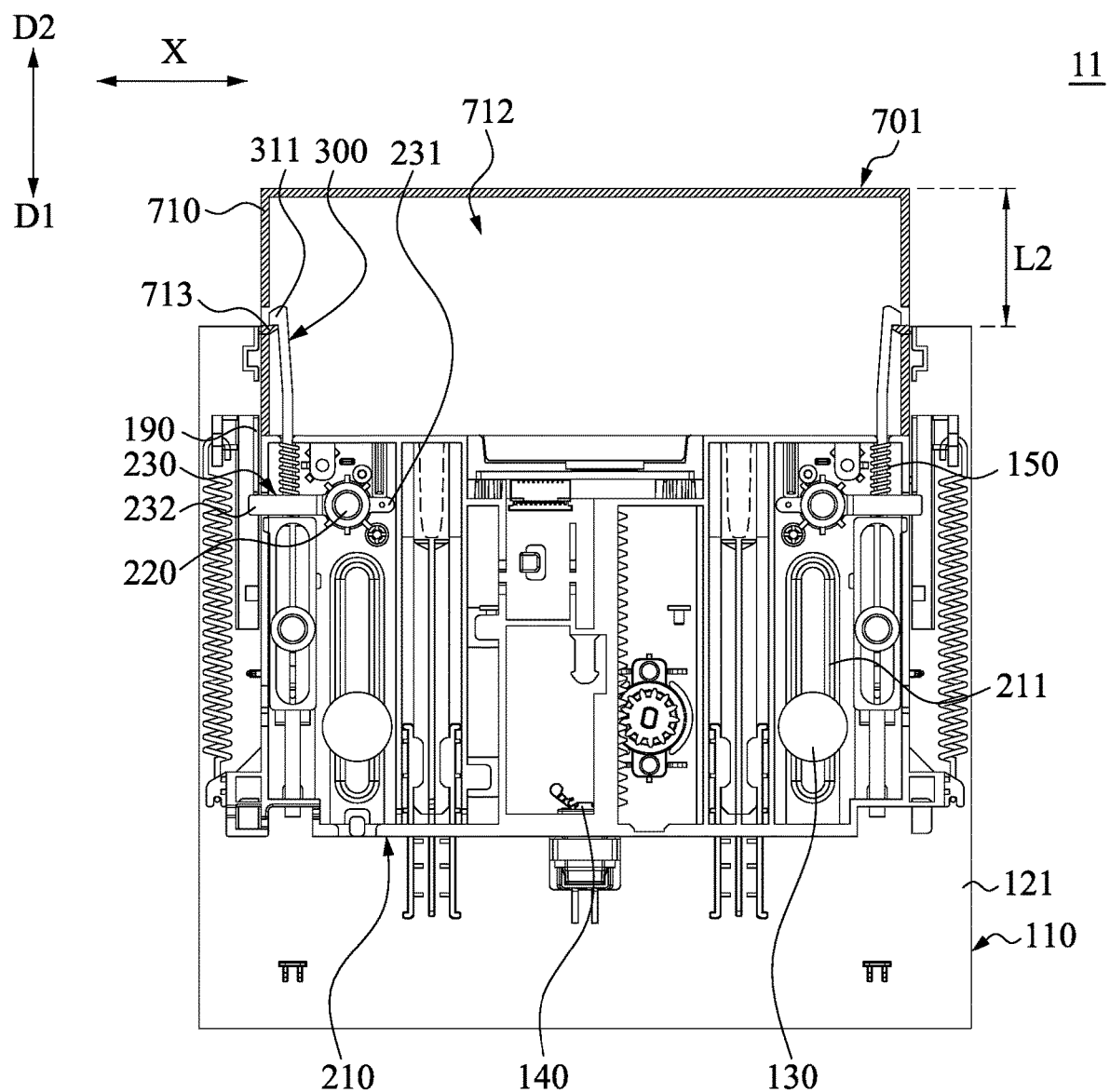

In the embodiment, the computer device 11 of FIG. 7A is substantially the same with the computer device 10 of FIG. 1, however, at least one difference of the computer device 11 of FIG. 7A from the computer device 10 of FIG. 1 is that the video camera module 701 further includes at least two pushing portions 715. The pushing portions 715 are symmetrically disposed on the bottom surface 711 of the housing 710, and extend outwards from the bottom surface 711 of the housing 710. The movable frame 210 includes two pivot shafts 220, two rotating levers 230 and two torsion springs 240. Each of the rotating levers 230 is provided with a first end 231 and a second end 232 being opposite to each other. Each of the pivot shafts 220 is arranged between the first end 231 and the second end 232. Each of the torsion springs 240 is connected to one of the rotating levers 230 and the movable frame 210. The casing 110 includes two stopping flanges 190. Each of the stopping flanges 190 is fixedly disposed in the assembly slot 120. For example, the stopping flanges 190 are symmetrically disposed on the inner surface 121 of the assembly slot 120 of the casing 110, and the movable frame 210 is located between the stopping flanges 190; however, the disclosure is not limited thereto. A vertical projection of each of the stopping flanges 190 overlaps the second end 232 of the rotating lever 230 when the second end 232 of the rotating lever 230 is positioned to be transverse.

Therefore, in the assembly of the video camera module 701, when the video camera module 701 is inserted into the assembly slot 120 by a user, the pushing portions 715 of the video camera module 701 respectively push the corresponding rotating lever 230 at the first end 231 thereof, so that the rotating lever 230 is rotated about the pivot shaft 220 to position the second end 232 thereof to be transverse relative to the pushing portion 715. That is, at this moment, the rotating lever 230 extends in the X-axis direction. Each of the torsion springs 240 enforces the rotating lever 230 back to its original position when the rotating lever 230 no longer pushes the first end 231 of the rotating lever 230.

In addition, in the ejection of the video camera module 701, when the movable frame 210 vertically rises to a certain height in the second direction D2, that is, when the second end 232 of the rotating lever 230 is moved to the stop flange 190, each of the stopping flanges 190 can physically interfere the second end 232 of the rotating lever 230 to determine the height of the video camera module 700 protruding outwards from the assembly slot 120. Since each stopping flange 190 physically interferes the second end 232 of the rotating lever 230, the movable frame 210 and the video camera module 701 cannot continue to be risen anymore, thereby determining the height (e.g., the length L2) of the video camera module 701 protruding outwards from the assembly slot 120.

It is noted, when a video camera module 700 having no pushing portion is inserted into the assembly slot 120 by a user, since the rotating lever 230 will not be rotated by the video camera module 700, thus, when the ejection of the video camera module 701 is operated, the movable frame 210 will not be physically interfered by the stopping flanges 190 so that the movable frame 210 and the video camera module 700 can rise without being blocked in advance, thereby allowing the video camera module 700 to have a greater height (e.g., length L1, FIG. 5A) protruding outwards from the assembly slot 120.

Thus, the aforementioned embodiments not only allow the user to replace another video camera module onto the computer device, but also allow the user to replace another video camera module with different height protruding outwards from the assembly slot 120, which not only the variability and diversity of assembly can be provided, but also the using willingness of users can be increased.

In the above embodiments, the disclosure is not limited to the type of the video camera module. For example, the video camera module 700 is a dual lens video camera module. The dual lens video camera module has two lenses, which are respectively located on opposite sides of the video camera module so as to capture two-way images.

However, the disclosure is not limited thereto. In other embodiments, the video camera module may also be a single lens video camera module. Since the single lens video camera module is smaller than a dual lens video camera module, the aforementioned structure can be selected to allow the single lens video camera module to protrude less area.

However, the disclosure is not limited thereto. In other embodiments, the video camera module 700 may also be a camera device having a distance detector, and the camera device has a photographic lens and a distance detector which are located at the same surface.

In addition, in the above embodiments, the disclosure is not limited to the type of the computer device, such as a cellular phone, a tablet PC, a notebook PC and an integrated desktop computer (i.e., all-in-one, AIO PC) and alike.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A computer device capable of removing a pop-up webcam installed therein, comprising:
    a main frame having a casing and an assembly slot formed on a surface of the casing, the casing comprising a toothed wheel pivotally connected to the casing, and a torque spring connected to the toothed wheel and the casing;
    a movable frame that is liftable in the assembly slot, and formed with a toothed-strip interface that is engaged with the toothed wheel;
    a coupling element that is slidably disposed on the movable frame;
    a spring element that is connected to the movable frame and the casing;
    a video camera module that is removably coupled with the coupling element and liftable in the assembly slot;
    a separating unit that is selectively disengaged the coupling element from the video camera module; and
    a compression spring that is elastically connected to the coupling element and the movable frame, for immediately moving the coupling element away from the video camera module when the coupling element and the video camera module are apart from each other,
    wherein, when a first restored elastic force of the spring element enforces the movable frame to rise, a second restored elastic force of the torque spring slows a rising speed of the movable frame enforced by the first restored elastic force of the spring element.

2. The computer device of claim 1, wherein the video camera module comprises a pushing portion, and the movable frame comprises a rotating lever, a pivot shaft and a torsion spring, the rotating lever is provided with a first end and a second end being opposite to each other, the pivot shaft is arranged between the first end and the second end, the torsion spring is connected to the rotating lever and the movable frame, wherein,
    when the pushing portion of the video camera module extends into the assembly slot to push the rotating lever at the first end thereof, the rotating lever is rotated about the pivot shaft to position the second end thereof to be transverse.

3. The computer device of claim 2, wherein the casing comprises a stopping flange fixedly disposed in the assembly slot, and a vertical projection of the stopping flange overlaps the second end of the rotating lever when the second end of the rotating lever is positioned to be transverse,
    wherein, when the movable frame is vertically risen, the stopping flange physically interferes the second end of the rotating lever to determine a height of the video camera module protruding outwards from the assembly slot.

4. The computer device of claim 1, wherein the movable frame comprises an elongated slit, and the casing comprises a positioning bolt fixed to the casing through the elongated slit, so that the positioning bolt is linearly movable within the elongated slit.

5. The computer device of claim 1, wherein the coupling element comprises an elongated groove, the movable frame comprises a positioning pin fixed to the movable frame through the elongated groove, so that the positioning pin is linearly movable within the elongated groove.

6. The computer device of claim 1, wherein the movable frame comprises a protruding portion; and the casing comprises a push-push fastening mechanism, wherein, when the video camera module is pressed down to press the push-push fastening mechanism with the protruding portion, the push-push fastening mechanism fastens the protruding portion, when the video camera module is pressed down again to press the push-push fastening mechanism with the protruding portion which has been fastened by the push-push fastening mechanism, the push-push fastening mechanism releases the protruding portion so that the movable frame is free to move.

7. The computer device of claim 1, wherein the movable frame comprises an installation portion disposed within the assembly slot, the main frame comprises a circuit board fixedly connected to the installation portion, and provided with a first connector, and the video camera module is provided with a second connector,
    wherein, when the video camera module is moved to the movable frame to hot-pluggably connect to the first connector through the second connector of the video camera module, the video camera module is electrically connected to the main frame.

8. The computer device of claim 1, wherein the coupling element comprises a hook body;
    the video camera module comprises a housing and a coupling portion, the housing is formed with an internal space on one bottom surface of the housing, and the coupling portion is protrudingly formed on an inner surface of the housing facing towards the internal space for being hooked by the hook body; and
    the separating unit comprises an ejector pin and a through hole penetrating through the housing to connect to the internal space and align with the coupling element,
    wherein, when the ejector pin is used to push the hook body away from the coupling portion in the inner surface through the through hole, the coupling element is disengaged from the video camera module.

9. The computer device of claim 1, wherein the video camera module is a single lens video camera module, a dual lens video camera module or a video camera module having a distance detector.

* * * * *